UNITED STATES PATENT OFFICE.

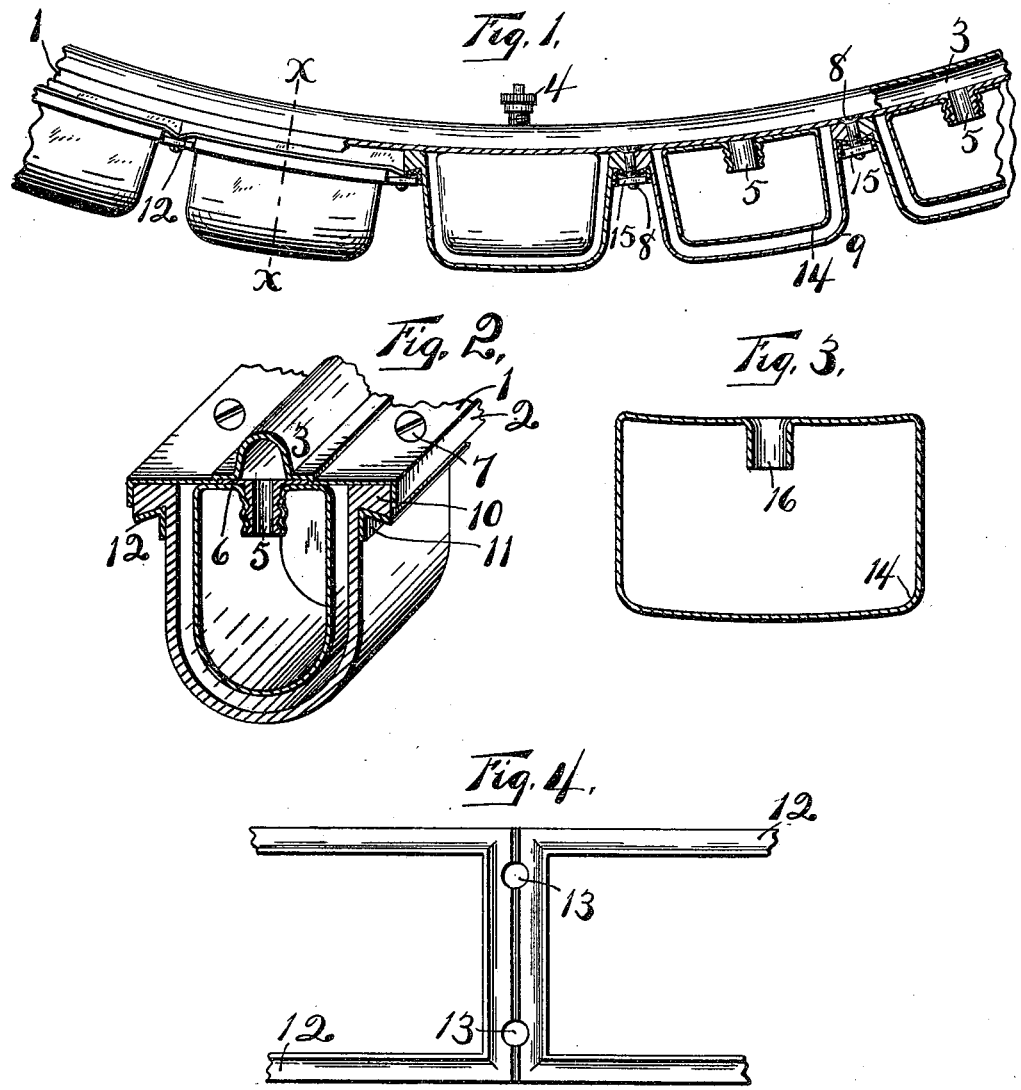

CHARLES MILLER, OF AUBURN, NEW YORK.

RIM AND TIRE FOR VEHICLE-WHEELS.

SPECIFICATION forming part of Letters Patent No. 644,622, dated March 6, 1900.

Application filed December 22, 1899. Serial No. 741,263. (No model.)

*To all whom it may concern:*

Be it known that I, CHARLES MILLER, of Auburn, in the county of Cayuga, in the State of New York, have invented new and useful Improvements in Rims and Tires for Wheels of Vehicles, of which the following, taken in connection with the accompanying drawings, is a full, clear, and exact description.

My invention relates to rims and tires for the wheels of vehicles, particularly the wheels of sulkies, motors, or power-driven vehicles.

My object is to produce a rim and tire which will be sufficiently strong to support heavy loads with a satisfactory degree of resiliency, all the parts of which coöperate to strengthen and support each other and in which the tire or part which directly supports the weight is divided into a number of sections of stiff material, each of which is removable independently of the others and each of which is provided with an inner pneumatic cushion of india-rubber not in immediate contact therewith, but which is adapted to receive and distribute the shock of any excessive blow to its corresponding outer section.

The pneumatic cushions all communicate with a channel which is an integral part of the rim, and particularly when filled with air under high pressure has for its object to strengthen the rim and to give all connected parts a high degree of resiliency and efficiency.

In the accompanying drawings, Figure 1 represents a portion of my rim and tire, parts being shown in section, with some of the attaching-bolts shown out of true position for the sake of clearness. Fig. 2 is an enlarged sectional view taken on the line $x\ x$, Fig. 1. Fig. 3 is a sectional view of one of the interior cushions or pouches. Fig. 4 is a view of part of two of the retaining-frames.

In the drawings, 1 represents the rim of my device. It is preferably made of sheet metal and is provided at each of its outer edges with an upturned flange 2 for a purpose to be described later. The channel 3 is preferably integral with the rim itself and may be formed therein by rolling.

4 represents an ordinary air-valve, to which an air-pump may be attached. A series of radial nipples 5 is provided either, as shown in Fig. 1, connected with the channel directly through the rim, if the channel be attached exteriorly, or attached to a reinforcing-piece 6, which is brazed or otherwise attached to the rim, as shown in Fig. 2. The rim is provided with holes for attaching-screws 7 and bolts 8, the use of which will be explained later.

I provide a number of sections or bulbs 9, formed of hard rubber, gutta-percha, cloth, or canvas charged with vulcanized or resinified oil, or other equivalents. These bulbs are made of thickness and rigidity sufficient to resist any ordinary impact in the course of travel without yielding to any considerable extent. They are stiff but yet sufficiently elastic to absorb and distribute all tremors and vibrations, which in the case of an unyielding tire would be transmitted to the vehicle and its burden. Each bulb or section is of substantially box-like form, tapering slightly outward and with rounded outer sides and ends. The bottom is curved to fit the curvature of the rim and is provided with a continuous flange 10 of suitable thickness, preferably undercut at its inner edge, as seen at 11. Into this flange take screws 7. Additional fastening means are bolts 8 and frames 12. These frames consist of sheet metal bent into angular form in cross-section, made to fit closely the flange and the sides of the sections or bulbs 9, and are at their ends provided with semicircular recesses 13. These frames are so made that they closely abut end to end, whereby the recesses 13 form circular apertures, through which pass the bolts 8, which are provided on their outer ends with suitable nuts 15. The outer edges of the flange are fitted against the upturned flange 2 of the rim.

Cushions, bags, or pouches 14 are provided of such a shape as to correspond substantially with the inside of the bulbs, so that when inflated they will fill the entire inner space of the bulb and serve to form a cushion for the outer bulb. It will thus be seen that when the tread of the tire or bulbs receive an excessive shock or blow it will yield to the extent that the effect of the blow is mitigated and its force distributed by means of the channel to all the cushions of the wheel. Each of the cushions is provided with a neck 16 for attachment to one of the nipples, before mentioned. It will also be observed that the harder the cushion 14 is blown the tighter the neck 16 will grip the nipple, so that the wrenching or racking of the tire and cushion will not cause it to leak. When a section becomes broken or otherwise loses its efficiency, the outer bulb is removed and replaced, or if the inner cushion is punctured it may be also readily replaced.

Having described my invention, what I claim, and desire to secure by Letters Patent, is—

1. A rim formed of sheet metal and having its edges turned at an angle, the channel extending longitudinally with the rim and provided with an air-valve, and the bottom provided with a continuous flange 10, combined with the frames 12 provided with semicircular recesses at their ends, the screws 8, and the nuts applied to the outer ends thereof, substantially as shown.

2. A vehicle-rim provided with a continuous air-channel, having pneumatic cushions communicating with said channel, outer removable bulbs covering said cushions, frames surrounding the bulbs, and means for attaching the frames and bulbs to the rim, substantially as described.

3. A vehicle-rim provided with a continuous air-channel, having pneumatic cushions communicating with said channel, and outer bulbs or sections of substantially box-like form, said bulbs being provided with flanges, frames resting on said flanges and attaching means, substantially as described.

4. A vehicle-rim provided with upturned flanges 2 and with a continuous air-channel, and a series of radial nipples communicating therewith, pneumatic cushions fitting over said cushions, outer sections or bulbs fitting over said cushions, but not in immediate contact therewith, said outer sections being provided with flanges adapted to fit against said upturned flanges 2, frames adapted to fit over said outer sections, and means for attaching said sections to the rim, substantially as described.

In witness whereof I have hereunto set my hand this 16th day of December, 1899.

CHARLES MILLER.

Witnesses:
HOWARD P. DENISON,
MILDRED M. NOTT.